(12) United States Patent
Frey

(10) Patent No.: US 7,071,712 B2
(45) Date of Patent: Jul. 4, 2006

(54) METHOD FOR THE AUTOMATIC IDENTIFICATION OF SENSOR SENSITIVITY

(75) Inventor: Jürgen Frey, Kirchheim/Teck (DE)

(73) Assignee: Priamus System Technology AG, Schaffhausen (CH)

( * ) Notice: Subject to any disclaimer, the term of this patent is extended or adjusted under 35 U.S.C. 154(b) by 0 days.

(21) Appl. No.: 10/473,529

(22) PCT Filed: Mar. 23, 2002

(86) PCT No.: PCT/EP02/03297

§ 371 (c)(1),
(2), (4) Date: Mar. 24, 2004

(87) PCT Pub. No.: WO02/082023

PCT Pub. Date: Oct. 17, 2002

(65) Prior Publication Data

US 2004/0143400 A1    Jul. 22, 2004

(30) Foreign Application Priority Data

Apr. 5, 2001    (DE) ................... 101 17 000

(51) Int. Cl.
G01R 27/08    (2006.01)
G01D 18/00    (2006.01)

(52) U.S. Cl. ............... 324/691; 324/649; 324/115; 702/104

(58) Field of Classification Search ........... 324/727, 324/115, 649, 691, 76.11, 76.74; 702/104
See application file for complete search history.

(56) References Cited

U.S. PATENT DOCUMENTS

| 4,473,797 | A | * | 9/1984 | Shiota ............... 324/115 |
| 4,524,349 | A | * | 6/1985 | Hyatt ............... 340/500 |
| 4,695,955 | A | * | 9/1987 | Faisandier ............ 600/300 |
| 5,256,960 | A | * | 10/1993 | Novini ............... 324/72 |
| 5,606,515 | A | * | 2/1997 | Mockapetris et al. ...... 702/106 |

* cited by examiner

*Primary Examiner*—Diane Lee
*Assistant Examiner*—Marina Kramskaya
(74) *Attorney, Agent, or Firm*—Bachman & LaPointe, P.C.

(57) ABSTRACT

A method for the automatic identification of sensor sensitivity, according to which resistance of a specific magnitude is allocated to the sensor. The resistance is used to allocate the sensor to a specific sensor group with a predetermined sensitivity range.

2 Claims, 1 Drawing Sheet

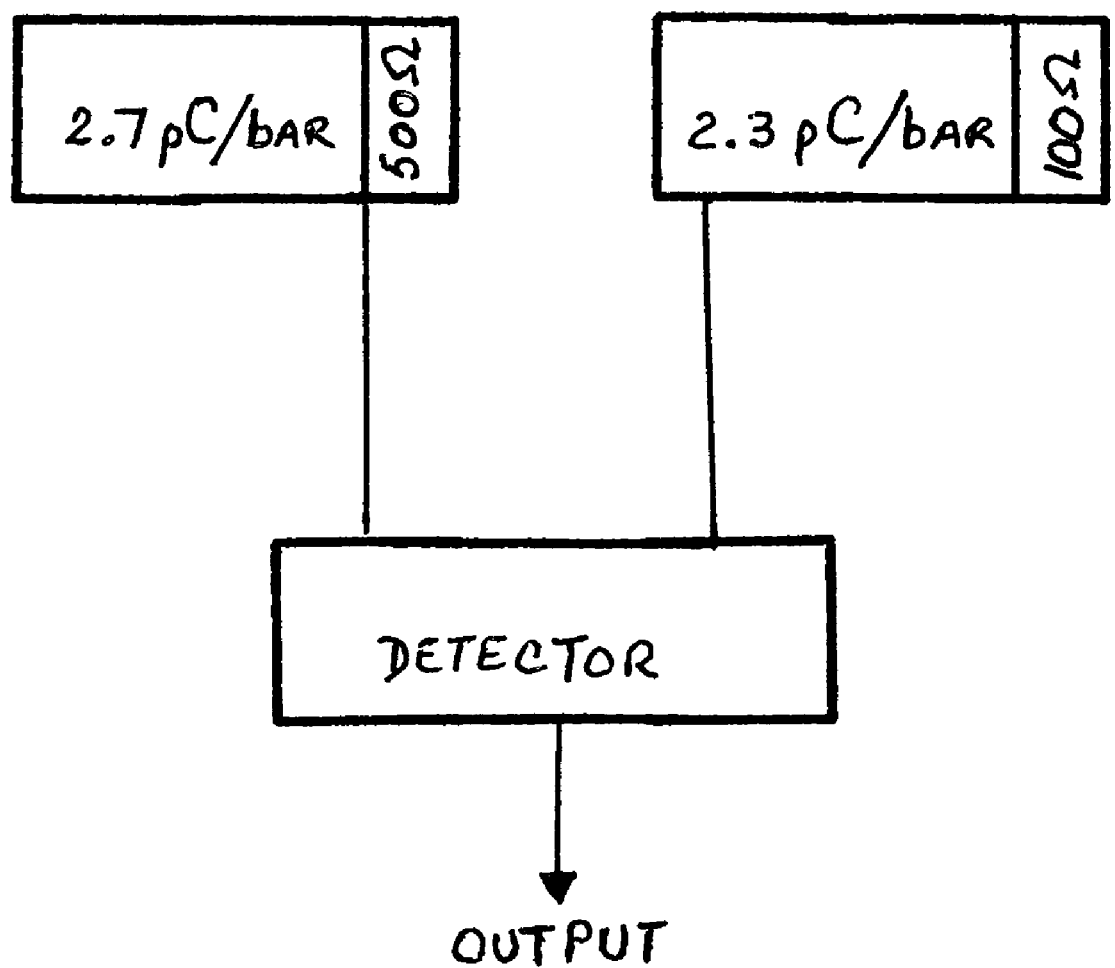

METHOD FOR THE AUTOMATIC IDENTIFICATION OF SENSOR SENSITIVITY

BACKGROUND OF THE INVENTION

The invention relates to a method for automatically detecting the sensitivity of sensors, in particular of piezoelectric sensors with individual sensitivities, sensors with a sensitivity around a specific value being assigned to a sensor group.

Sensors are currently being used in many technical fields for the purpose of detecting states, positions etc. The method described below relates chiefly to sensors that are differentiated by an individual sensitivity. It is merely preferred for the method to relate to piezoelectric sensors with the aid of which pressure, force or acceleration can be determined.

Such sensors are used, for example, in injection molds in order to determine a cavity pressure. The cavity pressure can then be used to determine, for example, the degree of filling of a cavity or the instant for the switchover from filling pressure to follow-up pressure.

A serious problem in handling such sensors resides in the individual sensor sensitivities, which are given in pC/bar (picocoulomb/bar) for pressure, or pC/N (picocouloumb/newton) for force. This sensitivity differs for each sensor for production reasons.

U.S. Pat. No. 4,695,955 discloses an electronic device that offers a universal interface between sensors and a processing system for the signals emanating from the sensors. In this case, the identification element for automatically detecting the sensor are shown. These identification elements comprise resistors.

U.S. Pat. No. 3,943,440 concerns a method of the above-named type, but not in relation to piezoelectric sensors. Instead, it describes elements for setting the sensitivity of a measuring circuit, a coding resistor being connected to the measuring circuit by a single wire. A current is conducted through this resistor via the wire. The voltage of the resistor is measured and coded in binary form by means of an A/D converter, in order to set the sensitivity of the measuring circuit.

SUMMARY OF THE INVENTION

The foregoing object is achieved by virtue of the fact that the sensors of the specific sensor group with a predetermined sensitivity range are assigned resistors of a specific resistor group with resistance values around a specific value.

BRIEF DESCRIPTION OF THE DRAWING

The FIGURE shows the sensors and resistors for Group 1.

DETAILED DESCRIPTION

There are, for example, three different sensor groups with three different nominal sensitivities for a specific field of application:

| | |
|---|---|
| Group 1 | 2.5 pC/bar |
| Group 2 | 10 pC/bar |
| Group 3 | 20 pC/bar |

For Group 1, resistors with 100 ohm steps are used, for Group 2 resistors with 1000 ohm steps, and for Group 3 resistors with 10000 ohm steps. In this way, the groups are detected and differentiated from one another. The FIGURE exemplifies Group 1.

It is an object of the present invention to develop a method of the above-named type that automatically detects the individual sensitivities of sensors and adapts the measuring ranges in a suitable device in an appropriate or optimum fashion.

This is preferably followed by fine classification or delimitation within the individual groups:

| Group 1 | |
|---|---|
| 2.3 pC/bar | 100 ohm |
| 2.4 pC/bar | 200 ohm |
| 2.5 pC/bar | 300 ohm |
| 2.6 pC/bar | 400 ohm |
| 2.7 pC/bar | 500 ohm |

| Group 2 | |
|---|---|
| 9.8 pC/bar | 1000 ohm |
| 9.9 pC/bar | 2000 ohm |
| 10.0 pC/bar | 3000 ohm |
| 10.1 pC/bar | 4000 ohm |
| 10.2 pC/bar | 5000 ohm |

| Group 3 | |
|---|---|
| 19.8 pC/bar | 10000 ohm |
| 19.9 pC/bar | 20000 ohm |
| 20.0 pC/bar | 30000 ohm |
| 20.1 pC/bar | 40000 ohm |
| 20.2 pC/bar | 50000 ohm |

The appropriate sensor that is to be used for a specific application is now preferably plugged into a charge amplifier (Plug & Play), via which the sensor sensitivity is defined. The amplifier automatically sets the optimum range.

The effectively scaled signal output for the user is communicated via control codes, and so it is superfluous for the user to input the sensitivity.

However, the aim is preferably not only to automatically detect the sensitivities in the amplifier, but also to automatically set the optimum measuring ranges. The best possible resolution of the measuring signal is always yielded in this way, and automatically.

The invention claimed is:

1. A method comprising the steps:
producing a plurality of sensors wherein each sensor has an actual sensitivity;
comparing the actual sensitivity of each sensor to a desired sensitivity to determine any deviation from the desired sensitivity;
forming (x) groups of sensors each having sensitivities within a predetermined range of a desired sensitivity wherein (X) is $\geq 1$;
forming a group of resistors having different specific resistance values within a predetermined range for each group of sensors;
connecting the group of resistors of specific resistance values to each group of sensors having a sensitivity within a predetermined range wherein the resistance values of the resistors are selected to identify the actual sensitivity of the sensors to which the resistors are connected within the group; and connecting at least one of the sensors with resistor to a detector means wherein the detector means measures the resistance of the resistor and determines the sensitivity of the sensor from the measured resistance for setting the operating measuring ranges of a manufacturing device based on the sensor sensitivity.

2. A method according to claim 1, wherein the number of groups is at least 3 and the first group of the resistors have resistances of between 100 and less than 1000 ohms wherein the second group of resistors is between 1000 and less than 10,000 ohms and the third group of resistors is between 10,000 and less than 100,000 ohms.

* * * * *